United States Patent [19]

Gordon

[11] Patent Number: 4,989,727
[45] Date of Patent: Feb. 5, 1991

[54] SKIRTBOARD APRON FOR A BELT CONVEYOR

[75] Inventor: James R. Gordon, Benton, Ill.

[73] Assignee: Gordon Belt Scrapers, Inc., Benton, Ill.

[21] Appl. No.: 518,786

[22] Filed: May 4, 1990

[51] Int. Cl.⁵ ............................................. B65G 21/20
[52] U.S. Cl. .................. 198/836.1; 198/525; 198/547
[58] Field of Search ............... 198/836.1, 836.2, 836.4, 198/525, 540, 547, 550.01, 550.13; 222/163, 285, 286, 408, 415; 52/403, 207

[56] References Cited

U.S. PATENT DOCUMENTS

| | | |
|---|---|---|
| Re. 31,249 | 12/1980 | Stahura . |
| 2,593,610 | 4/1952 | Roberts . |
| 2,665,795 | 1/1954 | Holwick . |
| 2,681,134 | 6/1954 | White, Jr. ................. 198/836.1 |
| 2,825,941 | 3/1958 | Lux et al. ................... 52/403 X |
| 2,883,035 | 4/1959 | Erisman .................... 198/525 X |
| 2,988,202 | 6/1961 | Pampel et al. ............ 198/547 X |
| 3,204,893 | 3/1962 | Lambert . |
| 3,344,909 | 10/1967 | Hansen et al. .............. 198/836.1 |
| 3,363,390 | 1/1968 | Crane et al. ................ 52/403 X |
| 3,399,466 | 9/1968 | Hartley ..................... 198/525 X |
| 3,499,523 | 3/1970 | Clegg . |
| 3,694,985 | 10/1972 | Spaiches ..................... 52/403 X |
| 3,759,004 | 9/1973 | Kent .......................... 52/403 X |
| 4,140,217 | 2/1979 | Dell ........................... 198/836.1 |
| 4,204,595 | 5/1980 | Marrs . |
| 4,231,471 | 11/1980 | Gordon . |
| 4,436,446 | 3/1984 | Gordon . |
| 4,641,745 | 2/1987 | Skates ...................... 198/836.1 |
| 4,667,810 | 5/1987 | Cowpertwait et al. ......... 198/525 |
| 4,768,319 | 9/1988 | Derner ...................... 52/403 X |
| 4,775,570 | 10/1988 | Ohlenforst et al. ......... 52/403 X |
| 4,874,082 | 10/1989 | Swinderman . |
| 4,877,125 | 10/1989 | Gordon . |

Primary Examiner—D. Glenn Dayoan
Attorney, Agent, or Firm—Kinzer, Plyer, Dorn, McEacrhan & Jambor

[57] ABSTRACT

A skirtboard apron for a belt conveyor is formed as an elongated molded or extruded elastomer member having a U-shaped upper mounting portion that slides onto the lower part of a skirtboard; the legs of the U-shaped mounting portion grip the sides of the skirtboard. A wiper portion of the apron, integral with the mounting portion, projects down into engagement with the conveyor belt. No fasteners are required, and no wear adjustments are necessary.

14 Claims, 2 Drawing Sheets

SKIRTBOARD APRON FOR A BELT CONVEYOR

BACKGROUND OF THE INVENTION

At the input station of an endless belt conveyor used for transporting coal, ore, sand, gravel, or other material, spillage of material over the edges of the belt may present a substantial problem. The spillage is usually controlled by positioning skirtboards along the edges of the conveyor belt for some distance downstream of the input location. Because the edge of a rigid skirtboard engaging the side of the belt could create undue friction and cause excessive wear on the belt, as well as undue loading of the conveyor drive, it has been conventional practice to position each skirtboard a short distance above the belt and to mount a flexible, resilient apron on the skirtboard to close the resulting gap. Some prior art systems have provided for vertical adjustment of each apron to compensate for wear on its lower edge; skirtboards equipped with vertically adjustable aprons of rubber, canvas, or other resilient material are described in Roberts U.S. Pat. No. 2,593,610 issued Apr. 22, 1952, in Clegg U.S. Pat. No. 3,499,523 issued Mar. 10, 1970, in Gordon U.S. Pat. No, 4,231,471 issued Nov. 4, 1980, and in Gordon U.S. Par. No. 4,877,125 issued Oct. 31, 1989.

While these and other previously known skirtboard apron arrangements can provide effective control of spillage at the input station of the conveyor, some difficult problems remain. Thus, continued wear on the lower edge of the apron eventually entails a downward adjustment; some of the previously known systems have required that the conveyor be shut down, though others, such as those of the aforementioned Gordon patents, may permit apron wear adjustment without a conveyor shutdown. Of course, any shutdown is highly undesirable, particularly in a high volume conveyor system. Another difficulty with some known skirtboard apron arrangements is encountered when wear on the apron reaches a stage such that apron replacement becomes necessary. Known systems have usually used a substantial number of bolts or other fasteners that must be released before the apron can be removed and replaced, unduly extending the conveyor down time required for replacement. In installations where long skirtboards are necessary, the vertical orientation usually used for the aprons may produce excessive friction on the belt, particularly following replacement of the apron or downward adjustment of the apron for wear compensation, with a resulting possibility of damage to the edges of the belts, damage to the conveyor drive, or both.

SUMMARY OF THE INVENTION

It is a principal object of the present invention, therefore, to provide a new and improved skirtboard apron for a belt conveyor that allows for rapid, convenient replacement of the apron and that requires no adjustment to compensate for wear on the apron, such adjustment occurring automatically.

Another object of the invention is to provide a new and improved skirtboard apron for a belt conveyor that effectively minimizes the friction between the apron and the conveyor for all conditions of apron wear, as long as the apron remains usable.

A further object of the invention is to provide a new and improved skirtboard apron for a belt conveyor that is simple and inexpensive in construction, that provides maximum life for the apron and the conveyor belt, and that requires no fasteners to mount the apron on a skirtboard.

Accordingly, the invention relates to a skirtboard apron for a belt conveyor of the kind comprising a conveyor belt, a rigid skirtboard of predetermined thickness positioned a short distance above and extending along one side of the conveyor belt, and a resilient, replaceable apron mounted on and extending downwardly from the skirtboard to close off the gap between the skirtboard and the belt. The apron comprises an elongated elastomer mounting portion of substantially U-shaped configuration mounted on the skirtboard with the legs of the U on opposite sides of the skirtboard and the upper parts of the legs of the U engaging the skirtboard; an elongated elastomer wiper portion extends downwardly from the bight of the U-shaped mounting portion into engagement with the upper surface of the conveyor belt.

DESCRIPTION OF THE PREFERRED EMBODIMENTS

Figure 1:
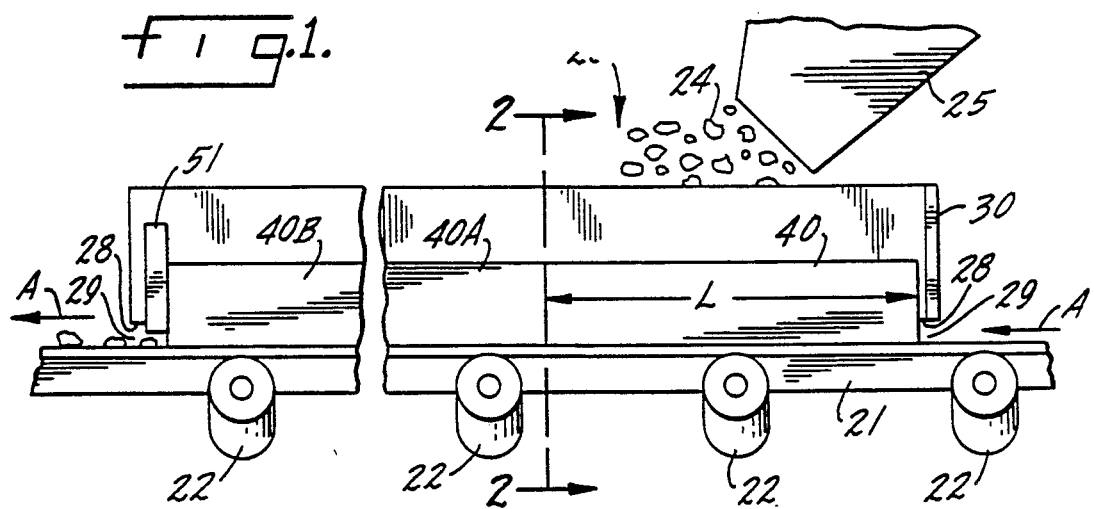
FIG. 1 is a side elevation view of the input location for a belt conveyor, illustrating a skirtboard apron constructed in accordance with one embodiment of the present invention.

FIG. 1 illustrates an input station 20 for a conveyor belt 21 supported on a series of rollers 22. Coal, ore, sand, gravel, or other material 24 is discharged onto conveyor belt 21, at station 20, from a chute 25. In a given system, chute 25 could also comprise the discharge end of another conveyor. An elongated skirtboard 27 is mounted adjacent the near edge of conveyor belt 21, extending along the edge of the conveyor belt in the direction of belt movement, indicated by the arrows A. A similar skirtboard (not shown) would be located on the opposite side of belt 21. The lower edge 28 of skirtboard 27 is positioned a short distance above the surface of the belt to prevent frictional engagement between the skirtboard and the conveyor belt. Thus, there is a gap 29 between the upper surface of belt 21 and the lower edge 28 of skirtboard 27. A transverse skirtboard 30 closes off the upstream end of input station 20.

The input station 20 of the conveyor system shown in FIG. 1 shows one complete skirtboard apron 40 and parts of two additional aprons 40A and 40B, all constructed in accordance with one preferred embodiment of the present invention. The skirtboard aprons 40, 40A, and 40B are all of the same construction, so that only one need be described in detail. Skirtboard apron 40 is best illustrated in Figs. 2 and 3, and will be described as shown therein.

Figure 2:
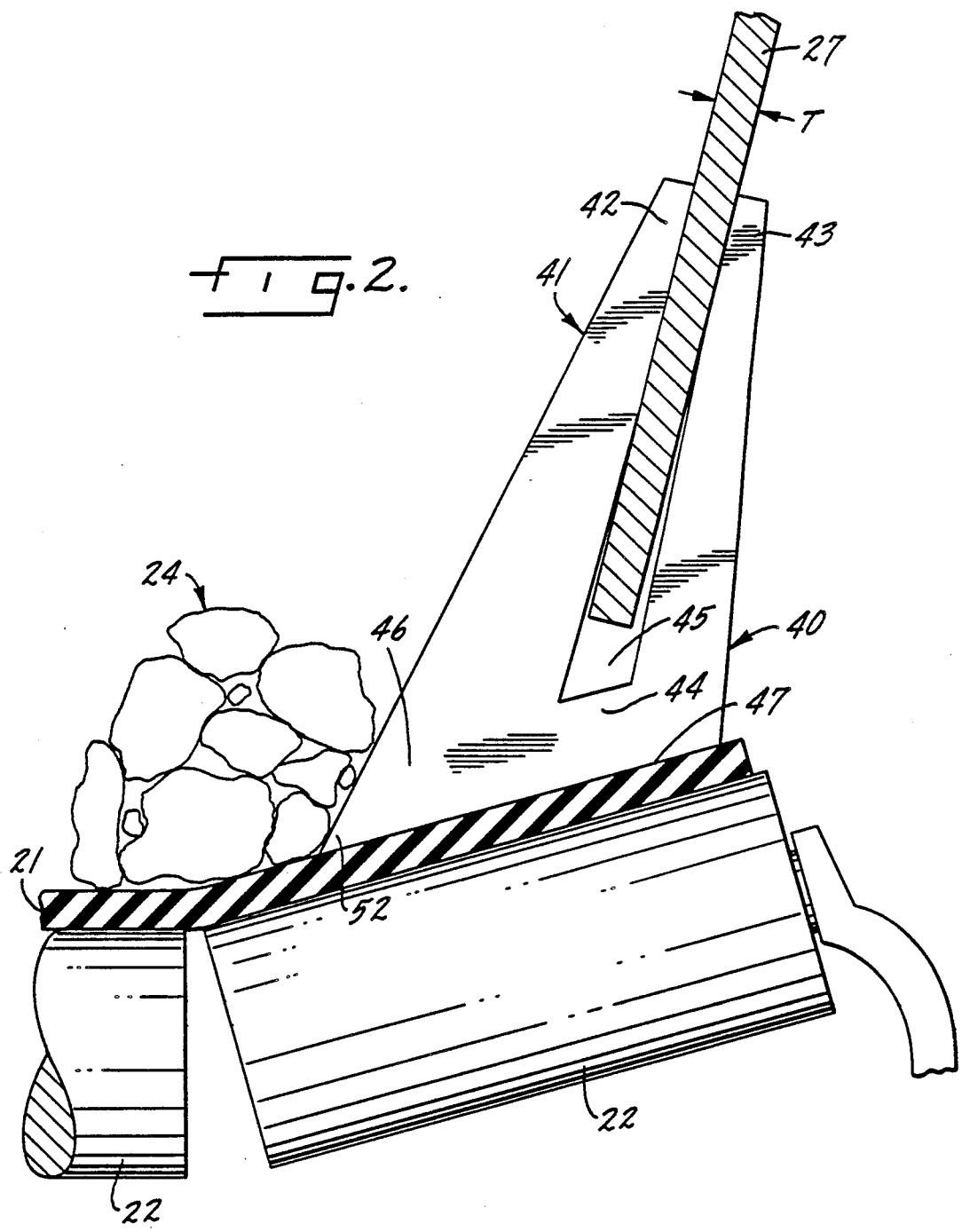
FIG. 2 is a detail sectional elevation view, on an enlarged scale, taken approximately as indicated by line 2—2 in FIG. 1.

As shown in FIG. 2, skirtboard 27 has a predetermined thickness T. Apron 40 is an elongated (see FIG. 1) molded elastomer member having an upper mounting portion 41 of generally U-shaped configuration including two upwardly projecting legs 42 and 43, a bight portion 44, and an open trough 45 above the bight portion 44 and between the legs 42 and 43. The top of trough 45, when apron 40 is not mounted on skirtboard 27, has a spacing S as shown in FIG. 3. This spacing S is preferably made appreciably narrower than the thickness T of skirtboard 27 (FIG. 2) so that the tops of the legs 42 and 43 of the apron will fit tightly onto the skirtboard. At the bottom, trough 45 is preferably appreciably wider than the thickness T of skirtboard 27, as best shown in FIG. 2.

Figure 3:
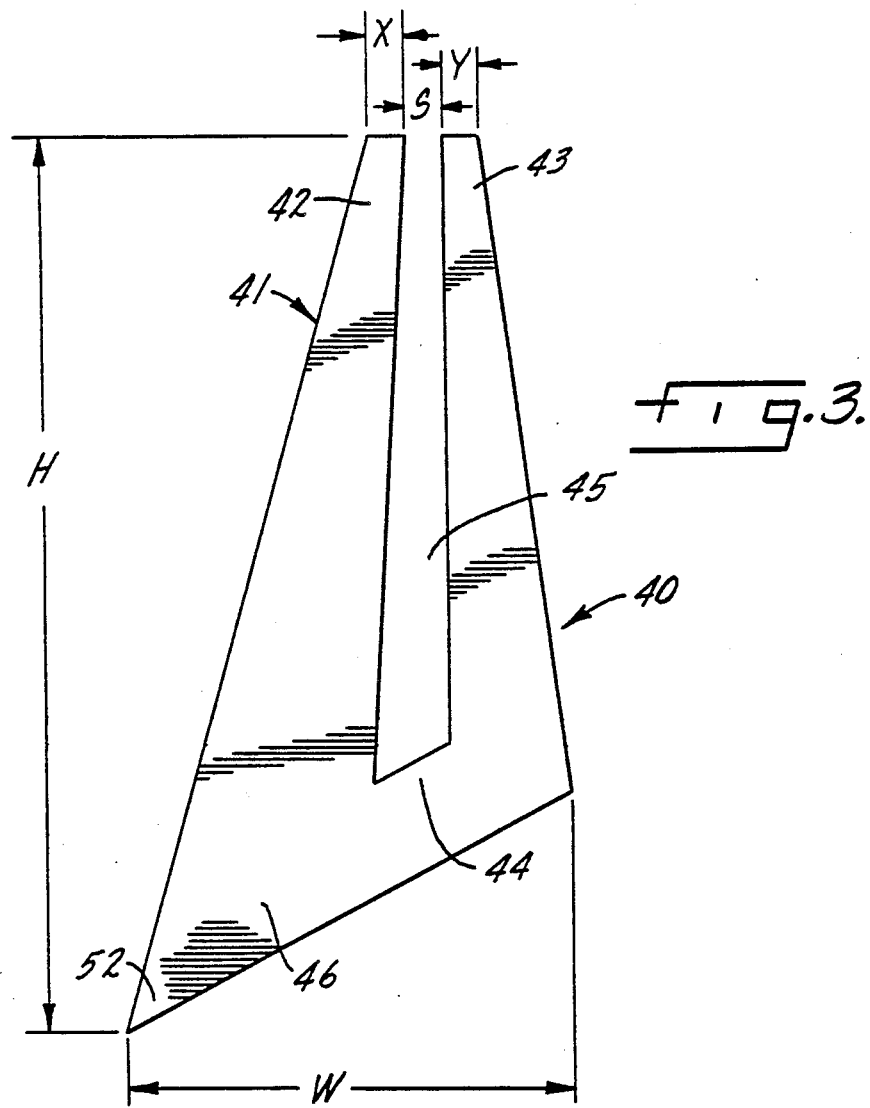
FIG. 3 is an end elevation view, drawn to the same scale as FIG. 2, of the skirtboard apron.

The lower portion 46 of skirtboard apron 40, Figs. 2 and 3, extends downwardly from the bight 44 of mounting portion 41. When apron 40 is mounted on skirtboard 27, as shown in FIG. 2, the lower portion 46 of the apron engages the upper surface 47 of conveyor belt 21. The specific shape of the lower or wiper portion 46 of conveyor belt apron 40 is not critical, but a generally V-shaped configuration, as shown in FIGS. 2 and 3, is preferred.

Skirtboard apron 40 may be molded from an elastomer selected to fit the operating conditions to be encountered in connection with conveyor belt 21. For relatively dry, clean, non-corrosive materials 24, FIGS. 1 and 2, skirtboard apron 40 may be molded of natural rubber. For other conveyor belt environments, and materials that are more likely to be wet or corrosive, the elastomer selected may be a synthetic resin such as polyurethane. Of course, mixtures of varying resins and elastomers, natural and synthetic, may be utilized.

The specific dimensions for a molded apron 40 are not critical; on the other hand, an indication of typical dimensions may be useful in understanding the preferred construction. Referring to FIG. 3, the spacing S may be approximately 0.25 inch or 0.63 cm, for use with a skirtboard having a thickness T (FIG. 2) of about 0.375 inch or 0.95 cm. The widths X and Y for the top of each of the two legs 42 and 43 of the mounting portion 41 of skirtboard 40 may typically be 0.25 inch, 0.63 cm. At the bottom of trough 45, the trough width may be 0.5 inch or 1.27 cm. The overall height of skirtboard apron 40 typically may be of the order of 6 inches, 15 cm. The width W of the skirtboard, by way of example, may be about 3 inches, 7.5 cm.

The length L of each skirtboard apron 40 (FIG. 1) is a matter of choice. Typically, this length may be two feet (71 cm) but virtually any other length could be selected. Moreover, the lengths of the skirtboard aprons 40, 40A and 40B need not be equal.

Installation of the skirtboard aprons 40, 40A and 40B on skirtboard 27 is quite simple. Each apron simply slides over the lower portion of skirtboard 27, as shown in FIG. 2, from the end or from the side of the skirtboard. One or more stops 51 (FIG. 1) may be provided on the skirtboard to limit movement of the aprons sliding along the skirtboard and to preclude the aprons from being pushed off of the skirtboard longitudinally, in the direction of the arrows A, by virtue of engagement of belt 21 with the aprons.

With continued use, of course, appreciable wear occurs at the lower tip end 52 of the skirtboard apron, see FIG. 2. But incremental wear does not require adjustment or replacement of the skirtboard aprons. Conveyor belt 21 and its associated operating mechanism are always subject to appreciable vibration and this vibration applies also to skirtboard 27. Consequently, as apron 40 wears, it simply tends to drop down lower on skirtboard 27 and continues in engagement with the upper surface 47 of belt 21. The same situation applies to the other aprons 40A and 40B, FIG. 1.

In the foregoing description, the skirtboard aprons 40, 40A and 40B are taken as molded elastomer members each of appreciable length L, though that length is subject to selection and need not be as extensive as illustrated in FIG. 1. On the other hand, a similar skirtboard apron can be manufactured by extrusion instead of by molding. Thus, a continuous length of skirtboard apron can be extruded, up to many hundreds of feet. The apron can then be cut to desired lengths for use, depending upon the lengths of the skirtboards 27 with which it is to be employed. As is in the case of molded aprons, an extruded apron may be made from natural rubber, synthetic resin elastomers, or a mixture, depending upon the requirements of the end use, particularly with respect to the type of material being conveyed in any given conveyor installation.

As previously noted, the bottom of the trough or opening 45 in the U-shaped upper part 41 of apron 40 is appreciably wider than the top of that trough, wider than the thickness T of skirtboard 27. This allows the skirtboard apron 40 to "float" to accommodate variations in the angle of belt 21. Thus, belt 21 can vary from a flat, horizontal position up to an angle of as much as 60°, and apron 40 will still afford a useful seal with belt surface 47. The forces applied to apron 40 by belt 21 make this possible. Stop 51, at the discharge end of skirtboard 27, and the frictional forces applied to apron 40, cause the apron 40 to suck into the conveyor belt, making a better seal.

The lower portion 46 of apron 40, on the inside of the apron, acts as a deflector for material 24, as well as a seal against belt surface 47. A clamp, as in Gordon U.S. Pat. No. 4,436,446, can be used at either end of apron 40 as a stop against longitudinal movement.

I claim:

1. A skirtboard apron for a belt conveyor of the kind comprising a conveyor belt, a rigid skirtboard of predetermined thickness positioned a short distance above and extending along one side of the conveyor belt, and a resilient, replaceable apron mounted on and extending downwardly from the skirtboard to close off the gap between the skirtboard and the belt, the apron comprising:

an elongated elastomer mounting portion of substantially U-shaped configuration, mountable on the skirtboard with the legs of the U on opposite sides of the skirtboard and the upper parts of the legs of the U engaging the skirtboard;

and an elongated elastomer wiper portion extending downwardly from the bight of the U-shaped mounting portion into engagement with the upper surface of the conveyor belt.

2. A skirtboard apron for a belt conveyor, according to claim 1, in which the mounting portion and the wiper portion of the apron are parts of an integral, molded elastomer apron member of predetermined length.

3. A skirtboard apron for a belt conveyor, according to claim 2, in which the elastomer is predominantly natural rubber.

4. A skirtboard apron for a belt conveyor, according to claim 2, in which the elastomer is predominantly a synthetic resin.

5. A skirtboard apron for a belt conveyor, according to claim 1, in which the mounting portion and the wiper portion of the apron are integral parts of one elongated extrusion.

6. A skirtboard apron for a belt conveyor, according to claim 5, in which the elastomer is predominantly natural rubber.

7. A skirtboard apron for a belt conveyor, according to claim 5, in which the elastomer is predominantly a synthetic resin.

8. A skirtboard apron for a belt conveyor, according to claim 1, in which the opening between the legs of the mounting portion, prior to mounting on the skirtboard, is narrower than the skirtboard thickness.

9. A skirtboard apron for a belt conveyor, according to claim 8, in which the mounting portion and the wiper portion of the apron are parts of an integral, molded elastomer apron member of predetermined length.

10. A skirtboard apron for a belt conveyor, according to claim 9, in which the elastomer is predominantly natural rubber 11. A skirtboard apron for a belt conveyor, according to claim 9, in which the elastomer is predominantly a synthetic resin.

12. A skirtboard apron for a belt conveyor, according to claim 8, in which the mounting portion and the wiper portion of the apron are integral parts of one elongated extrusion.

13. A skirtboard apron for a belt conveyor, according to claim 12 in which the elastomer is predominantly natural rubber.

14. A skirtboard apron for a belt conveyor, according to claim 12, in which the elastomer is predominantly a synthetic resin.

* * * * *